H. TORCHIANI.
AIR FILTER.
APPLICATION FILED NOV. 7, 1910.
1,001,094.
Patented Aug. 22, 1911.
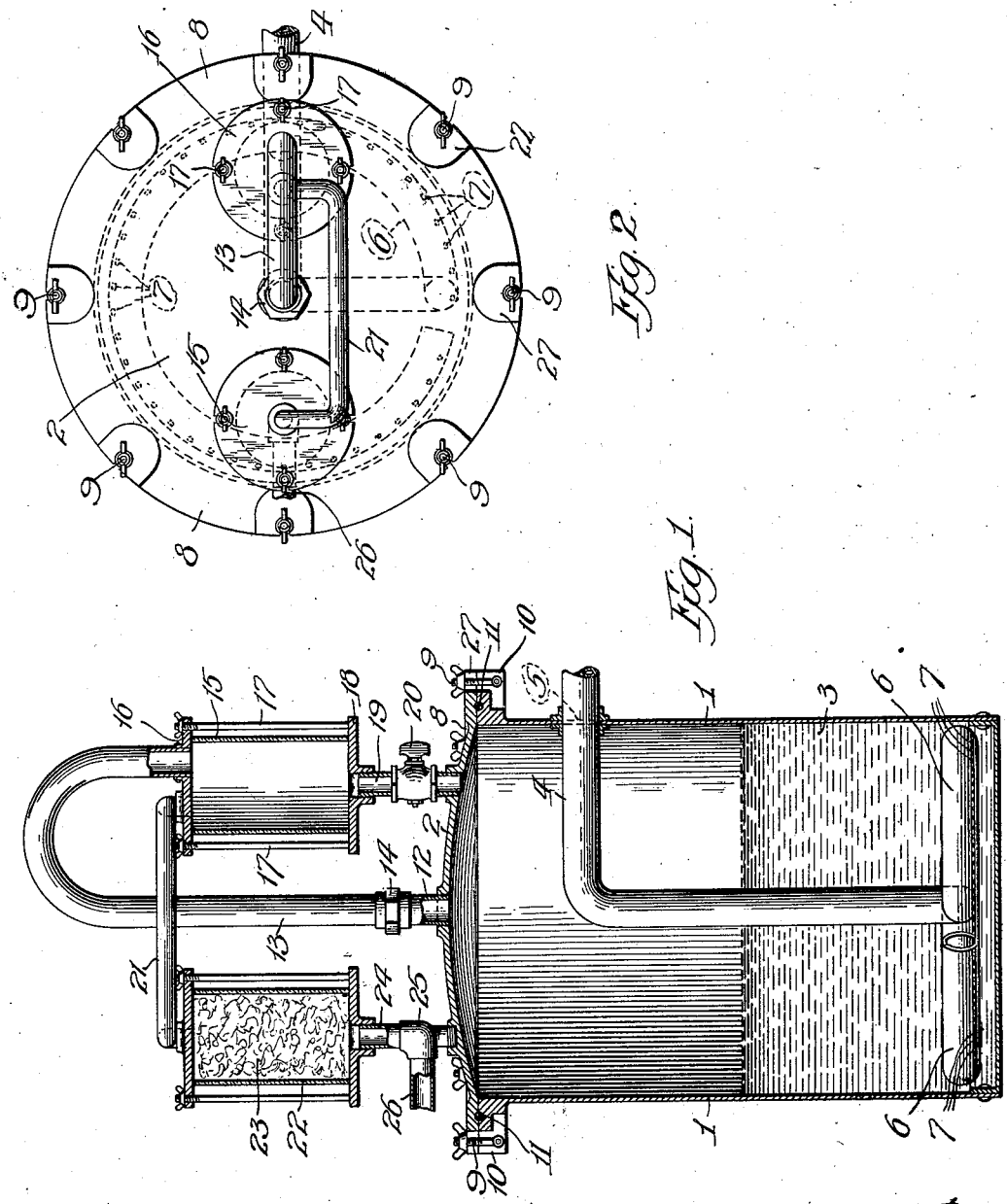
Witnesses:
Inventor:
Harry Torchiani

UNITED STATES PATENT OFFICE.

HARRY TORCHIANI, OF CHICAGO, ILLINOIS.

AIR-FILTER.

1,001,094.  Specification of Letters Patent.  Patented Aug. 22, 1911.

Application filed November 7, 1910. Serial No. 591,041.

*To all whom it may concern:*

Be it known that I, HARRY TORCHIANI, citizen of the United States, residing at Chicago, county of Cook, State of Illinois, have invented new and useful Improvements in Air-Filters, of which the following is a specification.

This invention relates to a device for filtering gaseous fluids and more particularly to a device for freeing air under pressure of bacteria and impurities contained therein.

An object of the invention is to provide a device having a receptacle into which the respective gas or mixture of gases is discharged under pressure, to send the fluid in a finely divided spray through a liquid contained in the receptacle, said liquid being adapted to annihilate bacteria and other impurities and to remove the moisture, which the gaseous fluid absorbs in its passage through the liquid.

Another object is to return the part of the moisture removed from the fluid to the liquid contained in the receptacle.

Another object is to dispose moisture absorbing means, so that they are readily visible, for the purpose of indicating the condition of the same and therefore also the condition of the liquid in the receptacle, so that they may be renewed.

Other objects are more fully described in the following specification and will be understood by reference to the accompanying drawing and the appended claims.

The drawing shows by way of example one embodiment of the invention.

Figure 1 is a longitudinal section through the embodiment, certain parts being shown in elevation. Fig. 2 is a top plan view of the same.

A receptacle 1 made of suitable material is provided with a removable closing means in form of a cover 2. The receptacle serves as container for a liquid 3, with which it is filled up to a certain height. One or more tubings 4 project preferably through apertures 5 in the wall of the receptacle 1; extending into the interior of the same and downwardly, and being bent at the lower end in the shape of a circular loop 6, disposed on or near the bottom of the receptacle. The circular portion 6 of the tubing is provided with a large number of discharge apertures 7.

In the embodiment illustrated by the drawing the cover 2 for the receptacle 1 is provided with a flange 8, having bosses 27 through which project fastening screws 9 pivotally mounted on the flange 10 of the receptacle 1. A packing ring 11 of suitable material is interposed between the cover and receptacle to prevent effectively the escape of gaseous fluid between these elements of the device.

The device comprises means for collecting the moisture, which the fluid takes along in its passage through the liquid. These means may be disposed within the container in the form of inclined dripping plates, preferably provided with perforations, or they may be composed of other elements against which the fluid impacts after its way through the liquid. In the embodiment illustrated the moisture collecting means are disposed on top of the container.

A short piping 12 opening into the interior of the container is connected with a tubing 13 preferably bent in the form of an inverted U, by means of a union 14. The other end of the tubing 13 opens into a receptacle 15, the cover 16 of which is securely held in place by means of screwbolts 17 extending from the bottom 18 of the vessel. A conduit 19 serves as communication between the vessel 15 and the container 1 and is provided with regulating means in form of a valve cock 20 for closing or opening more or less the conduit. Another pipe 21 extending from the top 16 of vessel 15 leads to a second vessel 22, similar in its construction to vessel 15. The interior of vessel 22 is filled with a moisture absorbing and filtering mass 23, preferably "filter mass" used in brewery establishments, or sterilized cotton. A short piping 24 extending from the bottom of vessel 22 is connected with an elbow 25 advisably fastened on cover 2 and discharge pipes 26 extending from the elbow may lead to the device (not shown) in which the filtered gaseous fluid is utilized.

The operation of the device is as follows: The container 1 is filled to a certain height with a liquid 3, which is well adapted to kill or annihilate bacteria or other impurities in the gaseous fluid conveyed through tubing 4 under pressure. For the purpose of cleaning compressed air for brewery purposes the use of permanganate of potassium as liquid is advisable. It is obvious that the material of which the receptacle is made, or with which it is coated must not be attacked by the liquid contained therein. The air or other gaseous fluid under pressure is discharged through the small apertures in a large plurality of fine jets, although it is obvious that a similar result may be obtained by the use of other means placed on or near the bottom of the receptacle. The air or other fluid being under pressure produces in its movement through the liquid in fine divided jets a strong agitation of the same, and this agitation contributes to purify the fluid conveyed therethrough. The fluid escapes through tubing 12 and 13 into the vessel 16, flowing into said last named vessel in downward direction and throwing particles of liquid which were taken along in its passage through the liquid against the bottom of vessel 15, where they are collected and from where the deposited liquid may be returned to receptacle 1, by opening the valve 20 while the device is at rest. The gaseous fluid is therefore primarily freed of moisture by its passage through vessel 15. The gas or air passes from vessel 15 through pipe 21 into vessel 22, and through the filter mass or sterilized cotton 23, where the last traces of moisture or impurity are removed.

The vessels 15 and 22 preferably are made of glass to allow of inspection of the contents of the same during the operation. The amount of liquid deposited in vessel 15 or the discoloring of the mass in vessel 22 will clearly indicate when a renewal of the liquid in vessel 1 is of advantage.

In brewery establishments, air under pressure usually is employed for filling beer from vats into kegs, or from kegs into bottles. The air is compressed by means of a well known compressor, and the lubricating oil on the pistons frequently is taken along in small particles by the air, exerting thereby a detrimental influence upon the beer. By means of the above described invention the air is not only sterilized by annihilating the detrimental bacteria contained therein, but it is also freed of any other impurities by its passage through the device.

Various modifications may be resorted to in the construction and arrangement of the various parts of this device without departing from the essential features set forth in the claims.

I claim:

1. In an air filter the combination of a receptacle adapted to contain a liquid for annihilating bacteria, a detachable cover for the receptacle, means for conveying air in a plurality of jets through the liquid, a vessel adapted to contain a moisture absorbing mass, said vessel being mounted on said cover, means extending from said cover for conveying air from the receptacle through said mass, a vessel interposed in said last named conveying means for collecting moisture from the air therein, said last named vessel being supported on said cover and being in communication with the receptacle.

2. In an air filter the combination of a receptacle adapted to contain a liquid for annihilating bacteria, a detachable cover for the receptacle, means for conveying air in a plurality of jets through the liquid, a vessel adapted to contain a moisture absorbing mass, said vessel being mounted on said cover, means extending from said cover for conveying air from the receptacle through said mass, a vessel interposed in said last named conveying means for collecting moisture from the air conveyed thereby, said last named vessel being supported on said cover and being in communication with the receptacle, both of said vessels having transparent portions to allow of inspection of their contents.

3. In an air filter a receptacle, a detachable cover therefor, two vessels mounted on said cover, a pipe leading from the cover to the top of one of said vessels, said vessel communicating with the receptacle through a valved pipe extending from the bottom of the vessel, and a pipe connecting both of said vessels at the top thereof, the other vessel containing a moisture absorbing sterilized mass.

Chicago, Illinois, Nov. 4th 1910.

HARRY TORCHIANI.

Witnesses:
HERBERT J. BRITZ,
EDWARD GRUSENDORF.

---

Copies of this patent may be obtained for five cents each, by addressing the "Commissioner of Patents, Washington, D. C."